(12) United States Patent
Rao et al.

(10) Patent No.: US 11,676,376 B2
(45) Date of Patent: Jun. 13, 2023

(54) METHOD FOR DETECTING FIELD NAVIGATION LINE AFTER RIDGE SEALING OF CROPS

(71) Applicant: ZHEJIANG UNIVERSITY, Zhejiang (CN)

(72) Inventors: Xiuqin Rao, Zhejiang (CN); Yangyang Lin, Zhejiang (CN); Yanning Zhang, Zhejiang (CN); Xiaomin Zhang, Zhejiang (CN); Yibin Ying, Zhejiang (CN); Haitao Yang, Zhejiang (CN); Haiyi Jiang, Zhejiang (CN); Yihang Zhu, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/780,029

(22) PCT Filed: Sep. 15, 2020

(86) PCT No.: PCT/CN2020/115253
§ 371 (c)(1),
(2) Date: May 26, 2022

(87) PCT Pub. No.: WO2022/047830
PCT Pub. Date: Mar. 10, 2022

(65) Prior Publication Data
US 2023/0005260 A1 Jan. 5, 2023

(30) Foreign Application Priority Data
Sep. 4, 2020 (CN) .......................... 202010922400.3

(51) Int. Cl.
*G06V 20/10* (2022.01)
*G06V 10/56* (2022.01)
*G06V 10/22* (2022.01)

(52) U.S. Cl.
CPC ............ *G06V 20/188* (2022.01); *G06V 10/23* (2022.01); *G06V 10/56* (2022.01)

(58) Field of Classification Search
CPC ....... G06V 20/188; G06V 10/56; G06V 10/23
See application file for complete search history.

(56) References Cited

U.S. PATENT DOCUMENTS 11,527,062 B2 * 12/2022 Albrecht .................. G06T 7/11
2017/0068855 A1    3/2017 Sharma et al.
(Continued)

FOREIGN PATENT DOCUMENTS

CN        102999757       3/2013
CN        103186773       7/2013
(Continued)

OTHER PUBLICATIONS

Xu et al., "Weed Density Detection Method Based on Absolute Feature Corner Points in Field" (pp. 1-20) (Year: 2020).*
(Continued)

*Primary Examiner* — Manav Seth
(74) *Attorney, Agent, or Firm* — JCIPRNET (57) ABSTRACT

A method for detecting a field navigation line after ridge sealing of crops includes the following steps. A field crop image is acquired. Image color space transformation, image binaryzation, longitudinal integration, neighborhood setting and region integration calculation are sequentially performed on the field crop image to obtain a crop row image. Detections of an initial middle ridge, a left ridge and a right ridge are performed on the crop row image to obtain center lines of the initial middle ridge, left ridge and right ridge. Center lines of a left (right) crop row are established by using an area 1 between the center lines of the left (right) ridge and the initial middle ridge. A center line model of a middle ridge is established by using an area 0 between the
(Continued)

center lines of the left and right crop rows, namely a navigation line of a field operation machine.

6 Claims, 6 Drawing Sheets

(56) References Cited

U.S. PATENT DOCUMENTS

| | | | | |
|---|---|---|---|---|
| 2021/0373562 | A1* | 12/2021 | Bousani | G06V 20/10 |
| 2022/0350991 | A1* | 11/2022 | Vesperman | G06T 7/40 |

FOREIGN PATENT DOCUMENTS

| | | |
|---|---|---|
| CN | 104567872 | 4/2015 |
| CN | 104616014 | 5/2015 |
| CN | 108710840 | 10/2018 |
| CN | 110243372 | 9/2019 |

OTHER PUBLICATIONS

Zhang et al., "Automated Mapping of Typical Cropland Strips in the North China Plain Using Small Unmanned Aircraft Systems (sUAS) Photogrammetry" (pp. 1-26) (Year: 2019).*

Garcia-Santillan et al., "Automatic detection of curved and straight crop rows from images in maize fields" (pp. 61-67). (Year: 2017).*

"International Search Report (Form PCT/ISA/210) of PCT/CN2020/115253", dated Feb. 26, 2021, with English translation thereof, pp. 1-4.

"Written Opinion of the International Searching Authority (Form PCT/ISA/237) of PCT/CN2020/115253", dated Feb. 26, 2021, pp. 1-3.

Guoquan Jiang et al., "Wheat rows detection at the early growth stage based on Hough transform and vanishing point", Computers and Electronics in Agriculture, vol. 123, Mar. 2016, pp. 211-223.

T. Hague et al., "A bandpass filter-based approach to crop row location and tracking", Mechatronics, vol. 11, Jan. 2020, pp. 1-12.

Fangming Zhang, "Study on Algorithms of Field Road Detection and Stereovision-based Guidance Algorithm for a Field Vehicle", Thesis of Master Degree, Zhejiang university, Apr. 2006, with English abstract, pp. 1-134.

M. Montalvo et al., "Automatic detection of crop rows in maize fields with high weeds pressure", Expert Systems with Applications, vol. 39, Nov. 2012, pp. 11889-11897.

Iván D.García-Santillán et al., "Automatic detection of curved and straight crop rows from images in maize fields", Biosystems Engineering, vol. 156, Feb. 2017, pp. 61-79.

* cited by examiner

| Column | -19 | -18 | -17 | -16 | -15 | -14 | -13 | -12 | -11 | -10 | -9 | -8 | -7 |
|---|---|---|---|---|---|---|---|---|---|---|---|---|---|
| Start row | -6 | -8 | -10 | -12 | -13 | -14 | -15 | -16 | -16 | -17 | -17 | -18 | -18 |
| End row | 6 | 8 | 10 | 12 | 13 | 14 | 15 | 16 | 16 | 17 | 17 | 18 | 18 |

| -6 | -5 | -4 | -3 | -2 | -1 | 0 | 1 | 2 | 3 | 4 | 5 | 6 |
|---|---|---|---|---|---|---|---|---|---|---|---|---|
| -19 | -19 | -19 | -19 | -19 | -19 | -20 | -19 | -19 | -19 | -19 | -19 | -19 |
| 19 | 19 | 19 | 19 | 19 | 19 | 20 | 19 | 19 | 19 | 19 | 19 | 19 |

| 7 | 8 | 9 | 10 | 11 | 12 | 13 | 14 | 15 | 16 | 17 | 18 | 19 |
|---|---|---|---|---|---|---|---|---|---|---|---|---|
| -18 | -18 | -17 | -17 | -16 | -16 | -15 | -14 | -13 | -12 | -10 | -8 | -6 |
| 18 | 18 | 17 | 17 | 16 | 16 | 15 | 14 | 13 | 12 | 10 | 8 | 6 |

METHOD FOR DETECTING FIELD NAVIGATION LINE AFTER RIDGE SEALING OF CROPS

CROSS-REFERENCE TO RELATED APPLICATION

This application is a 371 of international application of PCT application serial no. PCT/CN2020/115253, filed on Sep. 15, 2020, which claims the priority benefit of China application no. 202010922400.3, filed on Sep. 4, 2020. The entirety of each of the above mentioned patent applications is hereby incorporated by reference herein and made a part of this specification.

TECHNOLOGY FIELD

The invention relates to a method for automatic field navigation of agricultural machinery, and particularly to a method for detecting a field navigation line after a ridge sealing of crops.

BACKGROUND

The automatic operation of intelligent agricultural machinery in the field requires navigation control. As a general navigation technology, the satellite positioning system is applicable to the situation where a walking path is determined. However, in a field, due to factors such as changes in crop types and crop growth conditions, it is difficult to maintain a stable advance path in the field, and it needs to be adjusted according to the actual situation. Therefore, it is particularly important to identify field crops and provide navigation information for intelligent operating machines.

To implement the acquisition of field navigation information, scholars have carried out a lot of research.

Hough transform method: Jiang et al. (2016) used the over-green 2G-R-B feature combined with the Otsu threshold segmentation method and the moving window method to extract feature points of candidate crop rows. For the candidate straight lines extracted by Hough transform method, after processing based on a vanishing point and K-means clustering method, the real crop rows are obtained (Jiang H, Wang X, Wang Z, et al. wheat rows detection at the early growth stage based on Hough transform and vanishing point[J]. Computers & Electronics in Agriculture, 2016, 123:211-223).

Template matching method: Hague et al. (2001) matched wheat rows with a bandpass filter, which can effectively solve the image shadow problem. One function of the bandpass filter is to block some high-frequency signals to attenuate the effect of spurious features such as weeds and internal structural details of crop rows, and the second function is to block some low-frequency signals to suppress the effect of light changes. However, the adaptability of the method to different natural conditions needs to be further improved. (Hague T, Tillett ND. A bandpass filter-based approach to crop row location and tracking[J]. Mechatronics, 2001, 11(1):1-12). Zhang Fangming (2006) proposed an algorithm for locating crop rows by a trapezoidal model. Based on the grayscale features of the line scan lines of the image, a grayscale curve model representing crop characteristics was constructed, and the wavelet analysis method was used to extract the trend curve. Fast algorithms for target features from rough positioning to precise positioning are constructed. This rough-to-precise strategy based on wavelet decomposition can ensure the real-time performance of image processing algorithms, reliable detection, and fast calculation speed. However, when the vehicle deviates from the road greatly, if a certain row moves out of the field of view, a matching failure may occur accordingly. (Zhang Fangming. Research on field path recognition algorithm and vehicle autonomous navigation method based on stereo vision [D]. Zhejiang University, 2006).

Linear regression method: Montalvo et al. (2012) proposed the "Otsu and linear regression (OLR) method", i.e., crop rows are detected by least squares method (Montalvo M, Pajares G, Guerrero J M, et al. Automatic detection of crop rows in maize fields with high weeds pressure[J]. Expert Systems with Applications, An International Journal, 2012, 39(15):11889-11897). García-Santillán et al. (2017) proposed the detection based on micro-ROIs (DBMR) method, and based on multiple regions of interest, the Hough transform and the least squares method are combined. The Hough transform is used to locate the starting point of each crop row, then the ROI is divided into multiple horizontal bars, the candidate points are extracted each time by using the micro-ROI, and finally the least squares method is used to fit the crop row straight line (García-Santillán, Iván D, Montalvo, Martín, Guerrero, José M, et al. Automatic detection of curved and straight crop rows from images in maize fields[J]. Biosystems Engineering, 2017, 156:61-79).

The foregoing methods mostly extract navigation information based on the larger spacing among crops. However, in the late stage of growth of crops such as corns, cotton, and sugarcanes, the branches and leaves of two adjacent rows of the crops are overlapped with each other, that is, the rows of crops are closed (closed rows or closed ridges), and these methods are no longer applicable.

SUMMARY

To meet the requirements and solve the problems in the technology of the related art, the invention proposes a method for extracting navigation information by using regional integral difference, so as to implement the detection between the rows of closed crops.

The technical scheme of the invention is as follows.

The method includes the following steps:

1) Crop image acquisition: a camera is used to acquire a field crop image, recorded as an original image S1.

The optical axis of the camera takes pictures in the direction of the field ridge.

2) Image color space transformation: the original image S1 is converted to HSI color space to obtain an HSI image S2.

3) Image binarization: the pixel value of the pixel whose hue component value H is between 0.2 and 0.583 in the HSI image S2 is set to be 1, and the pixel values of the remaining pixels are set to be 0 to obtain a binary image S3.

4) Longitudinal integration: the binary image S3 is duplicated as a longitudinal integral image S4, and each column on the longitudinal integral image S4 is traversed. In each column, each pixel is traversed downward from the pixel of the second row. When traversing, the pixel values of the pixels of the previous row are added, and the result is covered with the pixel value of the current pixel, so as to obtain the longitudinal integral image S4.

5) Neighborhood setting: the neighborhood of the current pixel is set, and the neighborhood is 1/48 of the image width of the original image S1. A 3-row two-dimensional matrix R is used to represent the neighborhood, and a column in the two-dimensional matrix R represents a column in the neighborhood. Each element of the first row in the two-dimensional matrix R represents the column offset of each column in the neighborhood relative to the current pixel, each element of the second row represents the abscissa offset of the start row of each column in the neighborhood, and each element of the third row represents the abscissa offset of the end row of each column in the neighborhood.

6) Region integration calculation: a blank image having a size the same as that of the longitudinal integral image S4 is constructed as a region integration image S5, and each pixel is traversed on the longitudinal integral image S4, which is processed in the way as follows. When traversing, the current pixel coordinates are marked as (x, y), an accumulator C is set, and the initial value of the accumulator C is set to be 0. When traversing each column of the two-dimensional matrix R and traversing the two-dimensional matrix R, the elements of the first row to the third row of the current j-th column are $R_{1j}$, $R_{2j}$, and $R_{3j}$, the difference is obtained by subtracting the pixel value of the pixel with coordinates $(x+R_{3j}-1, y+R_{1j})$ from the pixel value of the pixel with coordinates $(x+R_{3j}, y+R_{1j})$ on the longitudinal integral image S4, and the difference is accumulated into the accumulator C. After traversing the two-dimensional matrix R is completed, the value in the accumulator C is taken as the regional integral value M of the current pixel, and the regional integral value M is assigned to the pixel having coordinates the same as those of the current pixel in the region integration image S5.

7) Detections of crop rows: each row is traversed in the region integration image S5, the average value of the regional integral value M of all pixels in each row is calculated, the pixel whose regional integral value M is greater than the average value is set to be 1, the remaining pixels are set to be 0, and a crop row image S6 is obtained.

8) Detections of the initial middle ridge, the left ridge, and the right ridge:

8.1) The crop row image S6 is divided into N crop row sub-images S7 having a width the same as the width of the crop row image S6 and a height 1/N of the height of the crop row image S6.

8.2) The i-th crop row sub-image S7 is taken, and a longitudinal projection vector S8 of the i-th crop row sub-image S7 is calculated.

8.3) Detection of the left boundary of the initial middle ridge: an initial middle ridge start detection template ML0 is constructed, and the initial middle ridge start detection template ML0 is a vector whose length is 1/6 of the width of the original image S1, the first half is 1, and the second half is −1. The longitudinal projection vector S8 is convolved with the initial middle ridge start detection template ML0, and the column number of the position of the point with the maximum convolution value is taken as an initial middle ridge left boundary $p0L0_i$ of the i-th crop row sub-image S7.

8.4) Detection of the right boundary of the initial middle ridge: an initial middle ridge termination detection template MR0 is constructed, and the initial middle ridge termination detection template MR0 is a vector whose length is 1/6 of the width of the original image S1, the first half is −1, and the second half is 1. The longitudinal projection vector S8 is convolved with the initial middle ridge termination detection template MR0, and the column number of the position of the point with the maximum convolution value is taken as an initial middle ridge right boundary $p0R0_i$ of the i-th crop row sub-image S7.

8.5) An initial middle ridge center $p0M0_i$ of the i-th crop row sub-image S7 is calculated by the following formula: $p0M0_i=(p0L0_i+p0R0_i)/2$.

8.6) Detection of the left boundary of the initial left row: an initial left row start detection template MR1 is constructed, and the initial left row start detection template MR1 is a vector whose length is 1/2 of the length of the initial middle ridge termination detection template MR0, the first half is −1, and the second half is 1. The initial left row start detection template MR1 is used to be convolved with the data of the longitudinal projection vector S8 on the left side of the initial middle ridge left boundary $p0L0_i$. The column number of the position of the point with the maximum convolution value is taken as an initial left row left boundary $CL0_i$ of the i-th crop row sub-image S7.

8.7) Detection of the right boundary of the initial right row: an initial right row termination detection template ML1 is constructed, and the initial right row termination detection template ML1 is a vector whose length is 1/2 of the length of the initial middle ridge start detection template ML0, the first half is 1, and the second half is −1. The initial right row termination detection template ML1 is used to be convolved with the data of the longitudinal projection vector S8 on the right side of the initial middle ridge right boundary $p0R0_i$. The column number of the position of the point with the maximum convolution value is taken as an initial right row right boundary $CR0_i$ of the i-th crop row sub-image S7.

8.8) Estimation of the center point of the left ridge: an initial left row horizontal center column $CLM0_i$ of the i-th crop row sub-image S7 is calculated by the following formula: $CLM0_i=(CL0_i+p0L0_i)/2$. Then, a column $pLM0_i$ where the center point of the left ridge of the i-th crop row sub-image S7 is located is calculated by the following formula: $pLM0_i=2\times CLM0_i-p0M0_i$.

8.9) Estimation of the center point of the right ridge: an initial right row horizontal center column $CRM0_i$ of the i-th crop row sub-image S7 is calculated by the following formula: $CRM0_i=(CR0_i+p0R0_i)/2$. Then, a column $pRM0_i$ where the center point of the right ridge of the i-th crop row sub-image S7 is located is calculated by the following formula: $pRM0_i=2\times CRM0_i-p0M0_i$.

8.10) Calculation of the ordinate of the crop row sub-image S7: the ordinate of the position of the center point of the crop row sub-image S7 on the crop row image S6 is taken as an ordinate $S7y_i$ of the crop row sub-image S7.

8.11) Determining the center lines of the initial middle ridge, the left ridge, and the right ridge.

Step 8.2) to step 8.11) are repeated, the N crop row sub-images S7 of the crop row image S6 are sequentially traversed. Each crop row sub-image S7 obtains an initial middle ridge center $p0M0_i$, an initial left row horizontal center column $CLM0_i$, an initial right row horizontal center column $CRM0_i$, and an ordinate $S7y_i$ of the crop row sub-image S7, and therefore the results of all N crop row sub-images S7 are composed to obtain a set of an initial middle ridge center set p0M0, an initial left row horizontal center column set CLM0, an initial right row horizontal center column set CRM0, and an ordinate set S7y of the crop row sub-image S7.

The ordinate $S7y_i$ of the crop row sub-image S7 serves as an independent variable, the initial middle ridge center $p0M0_i$, the initial left row horizontal center column $CLM0_i$, and the initial right row horizontal center column $CRM0_i$ serve as dependent variables, respectively, and the univariate regression models pM, pL and pR are constructed between the initial middle ridge center $p0M0_i$ and the ordinate $S7y_i$ of the crop row sub-image S7, between the initial left row horizontal center column $CLM0_i$ and the ordinate $S7y_i$ of the crop row sub-image S7, and between the initial right row horizontal center column $CRM0_i$ and the ordinate $S7y_i$ of the crop row sub-image S7, respectively. The univariate regression models pM, pL, and pR are actually a fitted straight line.

9) Detections of the left crop row and the right crop row:

9.1) A blank right crop row point set SCR and a blank left crop row point set SCL are constructed.

9.2) The k-th row is taken on the crop row image S6 as a row image S9, the ordinate of the row image S9 as an independent variable is substituted into the univariate regression models pM, pL, and pR to obtain a crop middle ridge center column $p0M1_k$, a crop left ridge horizontal center column $CLM1_k$, and a crop right ridge horizontal center column $CRM1_k$ on the current row image S9.

9.3) The blank left crop row point set SCL is constructed. On the current row image S9, the coordinates of the pixel with a pixel value of 1 between the crop middle ridge center column $p0M1_k$ and the crop left ridge horizontal center column $CLM1_k$ corresponding to the crop row image S6 is added to the left crop row point set SCL.

9.4) The blank right crop row point set SCR is constructed. On the current row image S9, the coordinates of the pixel with a pixel value of 1 between the crop middle ridge center column $p0M1_k$ and the crop right ridge horizontal center column $CRM1_k$ corresponding to the crop row image S6 is added to the right crop row point set SCR.

9.5) Step 9.2) to step 9.4) are repeated. Each row of the crop row image S6 is traversed to obtain the complete left crop row point set SCL and the right crop row point set SCR.

9.6) The ordinates of the pixels in the left crop row point set SCL serve as independent variables, the abscissas of the pixels in the left crop row point set SCL serve as dependent variables, and a univariate regression model for the left crop row point set SCL is constructed, and a left crop row centerline model CL is obtained.

9.7) The ordinates of the pixels in the right crop row point set SCR serve as independent variables, the abscissas of the pixels in the right crop row point set SCR serve as dependent variables, and a univariate regression model for the right crop row point set SCR is constructed, and a right crop row centerline model CR is obtained.

The left crop row centerline model CL and the right crop row centerline model CR are actually a fitted straight line.

10) Detection of the middle ridge:

10.1) A blank middle ridge point set Spath is constructed.

10.2) The q-th row on the crop row image S6 is taken as a row image S10, and the ordinate of the line image S10 as an independent variable is substituted into the left crop row centerline model CL and the right crop row centerline model CR to obtain a left row center point $CL1_q$ and a right row center point $CR1_q$ on the current line image S10.

10.3) On the current line image S10, the coordinates of the pixel with a pixel value of 0 between the left row center point $CL1_q$ and the right row center point $CR1_q$ corresponding to the crop row image S6 is added into the middle ridge point set SPath.

10.4) Step 10.2) to step 10.3) are repeated. Each row image S10 of the crop row image S6 is traversed to obtain the complete middle ridge point set Spath.

10.5) The ordinates of the pixels in the middle ridge point set SPath serve as independent variables, and the abscissas of the pixels in the middle ridge point set SPath serve as dependent variables. A univariate regression model is constructed for the middle ridge point set SPath, and a middle ridge centerline model pPath is obtained. The straight line where the middle ridge centerline model pPath is located is the navigation line for the field machinery.

Beneficial Effects of the Invention

The invention utilizes the difference of crop region integration to obtain an initial crop row. By constructing a regression model, an initial ridge is determined to be left and right crop rows, and then the left and right crop rows are used to construct the middle ridge centerline model, which overcomes the defect of which the previous methods cannot be applied to the extraction of navigation information of closed crops, implements the acquisition of navigation information between closed crop rows, and improves the adaptability of field machinery.

DESCRIPTION OF THE EMBODIMENTS

The invention is further illustrated with reference to the accompanying drawings and embodiments in the subsequent paragraphs.

The invention includes steps as follows.

Figure 1:
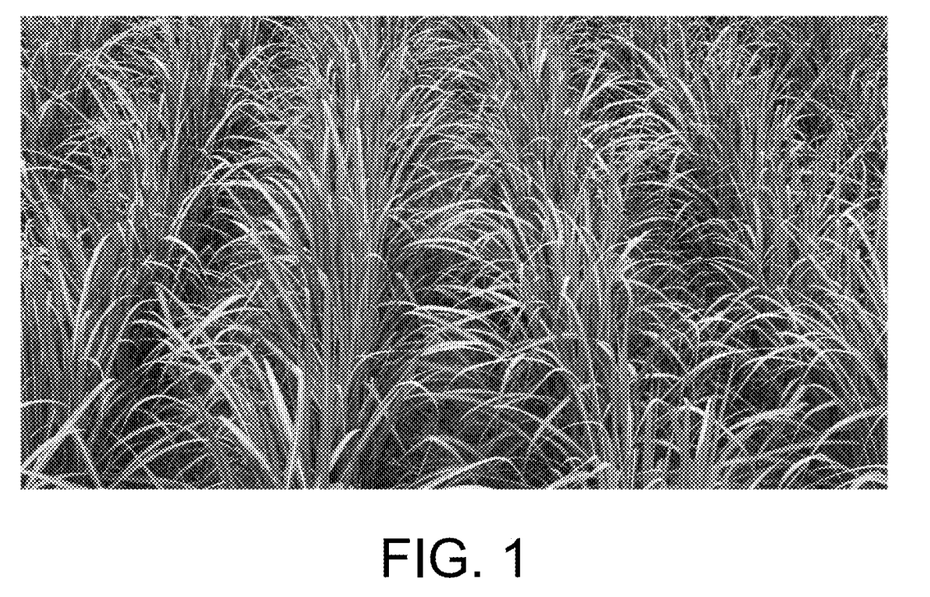
FIG. 1 is a schematic view of an original image S1 of an embodiment.

1) Crop image acquisition: a camera is used to acquire a field crop image, recorded as an original image S1, as shown in FIG. 1.

The optical axis of the camera takes pictures in the direction of the field ridge.

Figure 2:
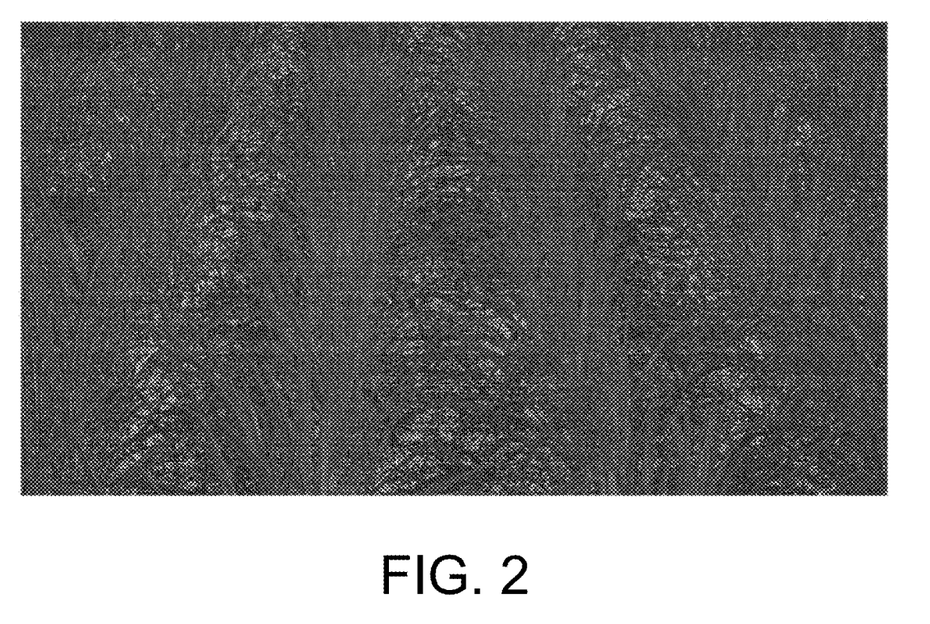
FIG. 2 is a schematic view of an HSI image S2 of an embodiment.

2) Image color space transformation: the original image S1 is converted to HSI color space to obtain an HSI image S2, as shown in FIG. 2.

Figure 3:
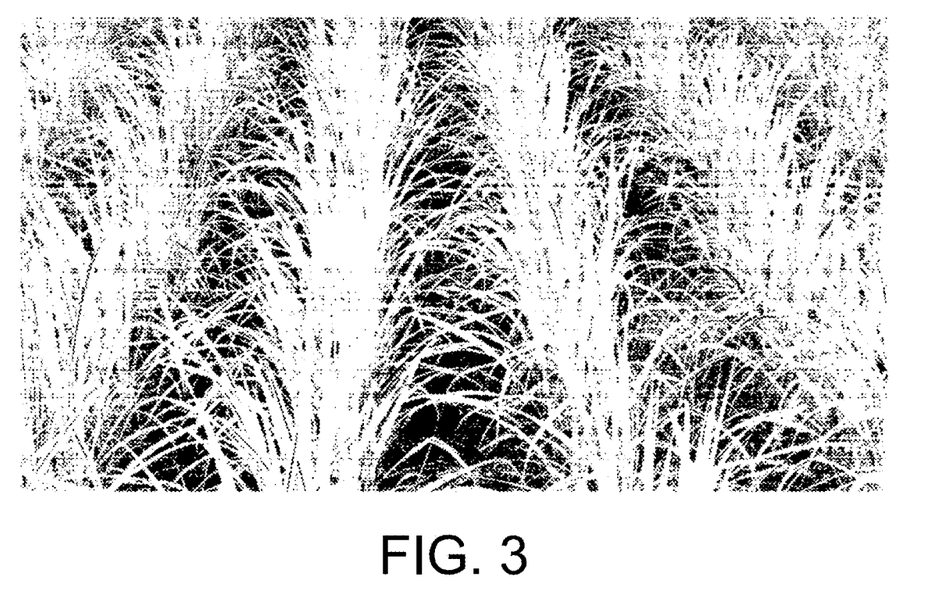
FIG. 3 is a schematic view of a binary image S3 of an embodiment.

3) Image binarization: the pixel value of the pixel whose hue component value H is between 0.2 and 0.583 in the HSI image S2 is set to be 1, and the pixel values of the remaining pixels are set to be 0 to obtain a binary image S3, as shown in FIG. 3.

Figure 4:
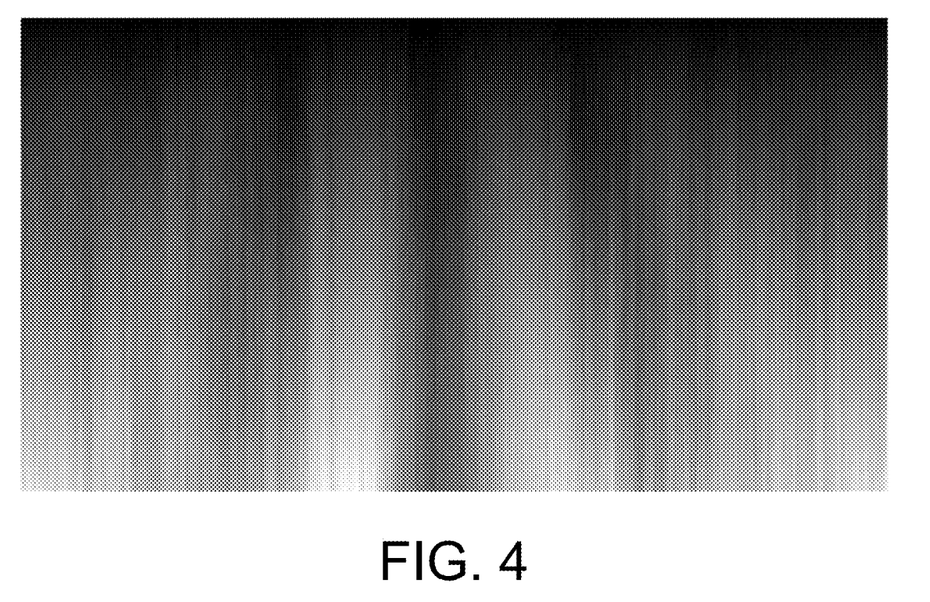
FIG. 4 is a schematic view of a longitudinal integral image S4 of the embodiment.

4) Longitudinal integration:

The binary image S3 is duplicated as a longitudinal integral image S4, and each column on the longitudinal integral image S4 is traversed. In each column, each pixel is traversed downward from the pixel of the second row. When traversing, the pixel values of the pixels of the previous row are added, and the result is covered with the pixel value of the current pixel, so as to obtain the longitudinal integral image S4, as shown in FIG. 4.

Figure 5:
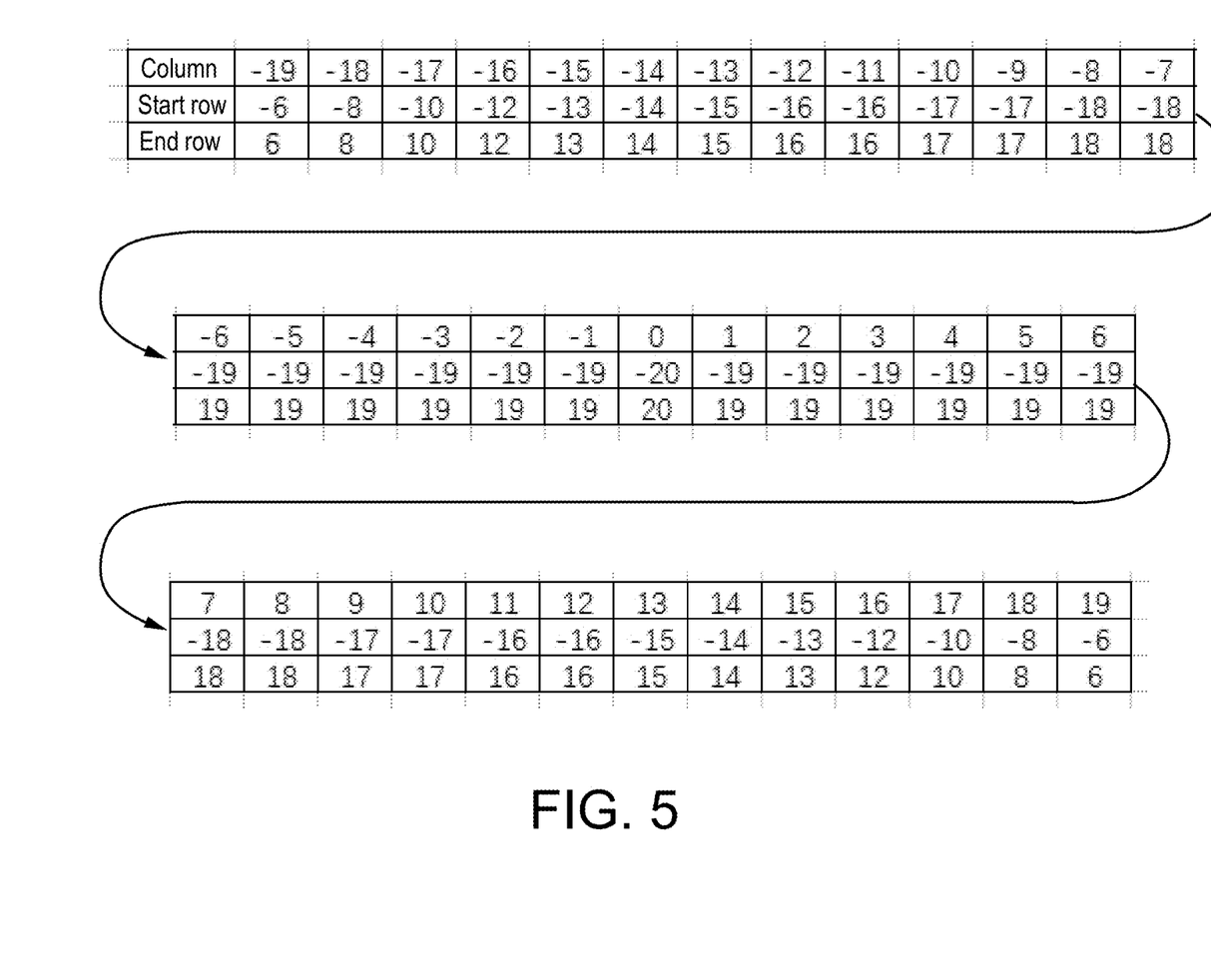
FIG. 5 is a schematic view of a neighborhood of an embodiment.

5) Neighborhood setting:

The neighborhood of the current pixel is set, and the neighborhood is 1/48 of the image width of the original image S1, as shown in FIG. 5. A 3-row two-dimensional matrix R is used to represent the neighborhood, and a column in the two-dimensional matrix R represents a column in the neighborhood. Each element of the first row in the two-dimensional matrix R represents the column offset of each column in the neighborhood relative to the current pixel, each element of the second row represents the abscissa offset of the start row of each column in the neighborhood, and each element of the third row represents the abscissa offset of the end row of each column in the neighborhood.

6) Region integration calculation:

A blank image having a size the same as that of the longitudinal integral image S4 is constructed as a region integration image S5, and each pixel is traversed on the longitudinal integral image S4, which is processed in the way as follows. When traversing, the current pixel coordinates are marked as (x, y), an accumulator C is set, and the initial value of the accumulator C is set to be 0. When traversing each column of the two-dimensional matrix R and traversing the two-dimensional matrix R, the elements of the first row to the third row of the current j-th column are $R_{1j}$, $R_{2j}$, and $R_{3j}$, the difference is obtained by subtracting the pixel value of the pixel with coordinates $(x+R_{3j}-1, y+R_{1j})$ from the pixel value of the pixel with coordinates $(x+R_{3j}, y+R_{1j})$ on the longitudinal integral image S4, and the difference is accumulated into the accumulator C. After traversing the two-dimensional matrix R is completed, the value in the accumulator C is taken as the regional integral value M of the current pixel, and the regional integral value M is assigned to the pixel having coordinates the same as those of the current pixel in the region integration image S5.

After traversing each pixel of the longitudinal integral image S4 is completed, the region integration image S5 is obtained, as shown in FIG. 5.

Figure 6:
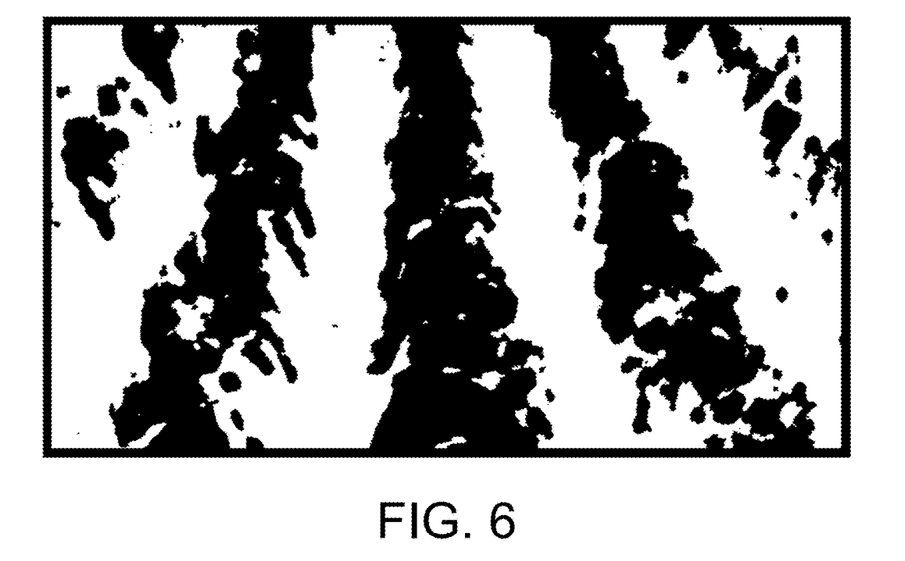
FIG. 6 is a schematic view of a crop row image S6 of the embodiment.

7) Detections of crop rows: Each row is traversed in the region integration image S5, the average value of the regional integral value M of all pixels in each row is calculated, the pixel whose regional integral value M is greater than the average value is set to be 1, the remaining pixels are set to be 0, and a crop row image S6 is obtained, as shown in FIG. 6.

8) Detections of the initial middle ridge, the left ridge, and the right ridge Step 8) is as follows specifically.

8.1) The crop row image S6 is divided into N crop row sub-images S7 having a width the same as the width of the crop row image S6 and a height 1/N of the height of the crop row image S6.

8.2) The i-th crop row sub-image S7 is taken, and a longitudinal projection vector S8 of the i-th crop row sub-image S7 is calculated.

Figure 7:
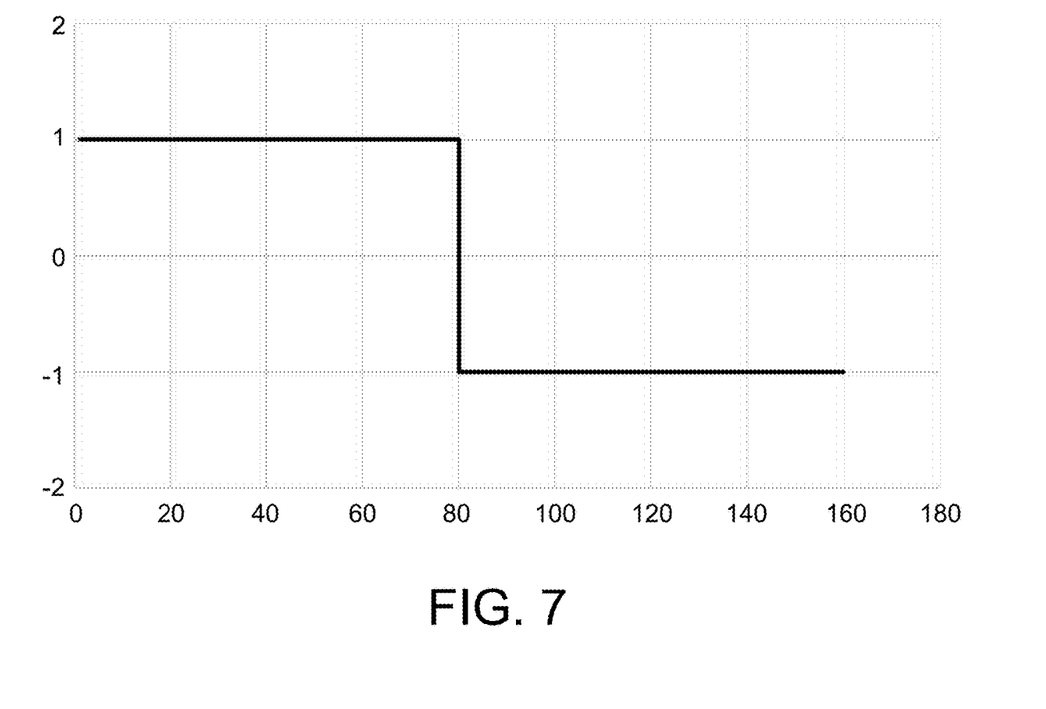
FIG. 7 is a schematic view of an initial middle ridge start detection template ML of an embodiment.

8.3) Detection of the left boundary of the initial middle ridge: an initial middle ridge start detection template ML0 is constructed, and the initial middle ridge start detection template ML0 is a vector whose length is 1/6 of the width of the original image S1, the first half is 1, and the second half is −1, as shown in FIG. 7. The longitudinal projection vector S8 is convolved with the initial middle ridge start detection template ML0, and the column number of the position of the point with the maximum convolution value is taken as an initial middle ridge left boundary $p0L0_i$ of the i-th crop row sub-image S7.

Figure 8:
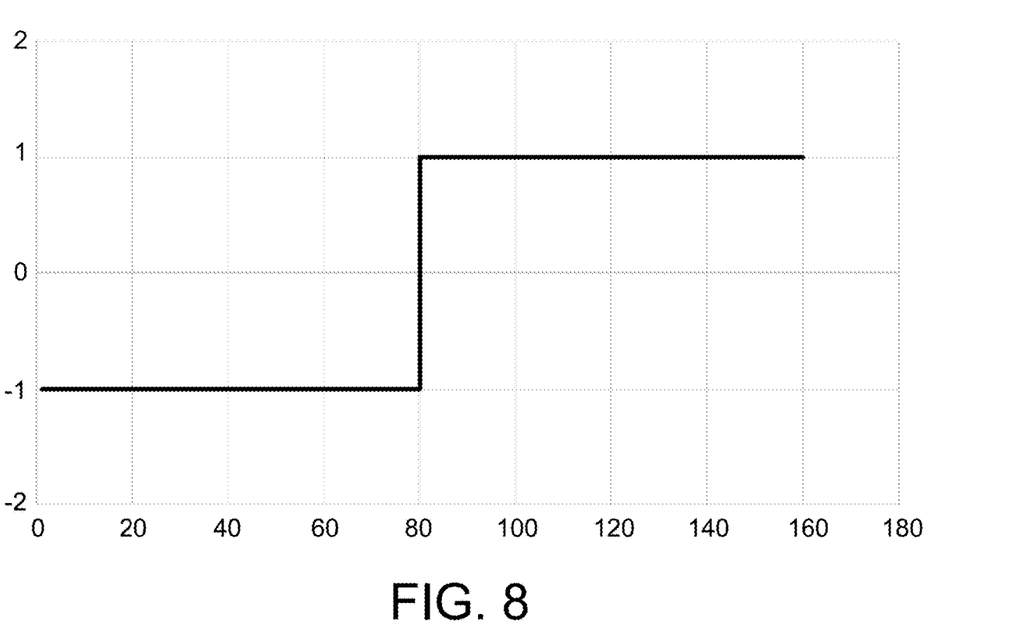
FIG. 8 is a schematic view of an initial middle ridge termination detection template MR of an embodiment.

8.4) Detection of the right boundary of the initial middle ridge: an initial middle ridge termination detection template MR0 is constructed, and the initial middle ridge termination detection template MR0 is a vector whose length is 1/6 of the width of the original image S1, the first half is −1, and the second half is 1, as shown in FIG. 8. The longitudinal projection vector S8 is convolved with the initial middle ridge termination detection template MR0, and the column number of the position of the point with the maximum convolution value is taken as an initial middle ridge right boundary $p0R0_i$ of the i-th crop row sub-image S7.

8.5) An initial middle ridge center $p0M0_i$ of the i-th crop row sub-image S7 is calculated by the following formula: $p0M0_i=(p0L0_i+p0R0_i)/2$.

8.6) Detection of the left boundary of the initial left row: an initial left row start detection template MR1 is constructed, and the initial left row start detection template MR1 is a vector whose length is 1/2 of the length of the initial middle ridge termination detection template MR0, the first half is −1, and the second half is 1. The initial left row start detection template MR1 is used to be convolved with the data of the longitudinal projection vector S8 on the left side of the initial middle ridge left boundary $p0L0_i$. The column number of the position of the point with the maximum convolution value is taken as an initial left row left boundary $CL0_i$ of the i-th crop row sub-image S7.

8.7) Detection of the right boundary of the initial right row: an initial right row termination detection template ML1 is constructed, and the initial right row termination detection template ML1 is a vector whose length is 1/2 of the length of the initial middle ridge start detection template ML0, the first half is 1, and the second half is −1. The initial right row termination detection template ML1 is used to be convolved with the data of the longitudinal projection vector S8 on the right side of the initial middle ridge right boundary $p0R0_i$. The column number of the position of the point with the maximum convolution value is taken as an initial right row right boundary $CR0_i$ of the i-th crop row sub-image S7.

8.8) Estimation of the center point of the left ridge: an initial left row horizontal center column $CLM0_i$ of the i-th crop row sub-image S7 is calculated by the following formula: $CLM0_i=(CL0_i+p0L0_i)/2$. Then, a column $pLM0_i$ where the center point of the left ridge of the i-th crop row sub-image S7 is located is calculated by the following formula: $pLM0_i=2\times CLM0_i-p0M0_i$.

8.9) Estimation of the center point of the right ridge: an initial right row horizontal center column $CRM0_i$ of the i-th crop row sub-image S7 is calculated by the following formula: $CRM0_i=(CR0_i+p0R0_i)/2$. Then, a column $pRM0_i$ where the center point of the right ridge of the i-th crop row sub-image S7 is located is calculated by the following formula: $pRM0_i=2\times CRM0_i-p0M0_i$.

8.10) Calculation of the ordinate of the crop row sub-image S7: The ordinate of the position of the center point of the crop row sub-image S7 on the crop row image S6 is taken as an ordinate $S7y_i$ of the crop row sub-image S7.

8.11) Determining the center lines of the initial middle ridge, the left ridge, and the right ridge.

Step 8.2) to step 8.11) are repeated, the N crop row sub-images S7 of the crop row image S6 are sequentially traversed. Each crop row sub-image S7 obtains an initial middle ridge center $p0M0_i$, an initial left row horizontal center column $CLM0_i$, an initial right row horizontal center column $CRM0_i$, and an ordinate $S7y_i$ of the crop row sub-image S7, and therefore the results of all N crop row sub-images S7 are composed to obtain a set of an initial middle ridge center set p0M0, an initial left row horizontal center column set CLM0, an initial right row horizontal center column set CRM0, and an ordinate set S7y of the crop row sub-image S7.

Figure 9:
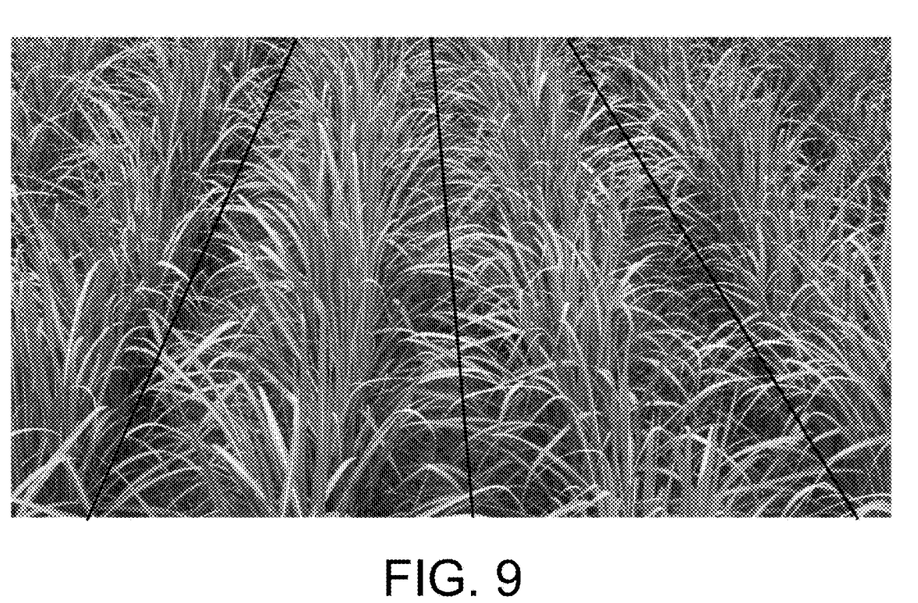
FIG. 9 is a schematic view of a left ridge centerline, an initial middle ridge centerline, and a right ridge centerline of the embodiment.

As shown in FIG. 9, the ordinate $S7y_i$ of the crop row sub-image S7 serves as an independent variable, the initial middle ridge center $p0M0_i$, the initial left row horizontal center column $CLM0_i$, and the initial right row horizontal center column $CRM0_i$ serve as dependent variables, respectively, and the univariate regression models pM, pL and pR are constructed between the initial middle ridge center $p0M0_i$ and the ordinate $S7y_i$ of the crop row sub-image S7, between the initial left row horizontal center column $CLM0_i$ and the ordinate $S7y_i$ of the crop row sub-image S7, and between the initial right row horizontal center column $CRM0_i$ and the ordinate $S7y_i$ of the crop row sub-image S7, respectively. The univariate regression models pM, pL, and pR are actually a fitted straight line.

As shown in FIG. 9, the three straight lines from left to right in the drawing are pL, pM, and pR, respectively.

9) Detections of the left crop row and the right crop row:
The implementation is as follows.

9.1) A blank right crop row point set SCR and a blank left crop row point set SCL are constructed.

9.2) The k-th row is taken on the crop row image S6 as a row image S9, the ordinate of the row image S9 as an independent variable is substituted into the univariate regression model pM, pL, and pR to obtain a crop middle ridge center column $p0M1_k$, a crop left ridge horizontal center column $CLM1_k$, and a crop right ridge horizontal center column $CRM1_k$ on the current row image S9.

9.3) The blank left crop row point set SCL is constructed. On the current row image S9, the coordinates of the pixel with a pixel value of 1 between the crop middle ridge center column $p0M1_k$ and the crop left ridge horizontal center column $CLM1_k$ corresponding to the crop row image S6 is added to the left crop row point set SCL.

9.4) The blank right crop row point set SCR is constructed. On the current row image S9, the coordinates of the pixel with a pixel value of 1 between the crop middle ridge center column $p0M1_k$ and the crop right ridge horizontal center column $CRM1_k$ corresponding to the crop row image S6 is added to the right crop row point set SCR.

9.5) Step 9.2) to step 9.4) are repeated. Each row of the crop row image S6 is traversed to obtain the complete left crop row point set SCL and the right crop row point set SCR.

9.6) The ordinates of the pixels in the left crop row point set SCL serve as independent variables, the abscissas serve as dependent variables, a univariate regression model for the left crop row point set SCL is constructed, and a left crop row centerline model CL is obtained.

9.7) The ordinates of the pixels in the right crop row point set SCR serve as independent variables, the abscissas serve as dependent variables, a univariate regression model for the right crop row point set SCR is constructed, and a right crop row centerline model CR is obtained.

The left crop row centerline model CL and the right crop row centerline model CR are actually a fitted straight line.

10) Detection of the middle ridge:
The implementation is as follows.

10.1) A blank middle ridge point set Spath is constructed.

10.2) The q-th row on the crop row image S6 is taken as a row image S10, and the ordinate of the line image S10 as an independent variable is substituted into the left crop row centerline model CL and the right crop row centerline model CR to obtain a left row center point $CL1_q$ and a right row center point $CR1_q$ on the current line image S10.

10.3) On the current line image S10, the pixel with a pixel value of 0 between the left row center point $CL1_q$ and the right row center point $CR1_q$ corresponding to the coordinates of the crop row image S6 is added into the middle ridge point set SPath.

10.4) Step 10.2) to step 10.3) are repeated. Each row image S10 of the crop row image S6 is traversed to obtain the complete middle ridge point set Spath.

Figure 10:
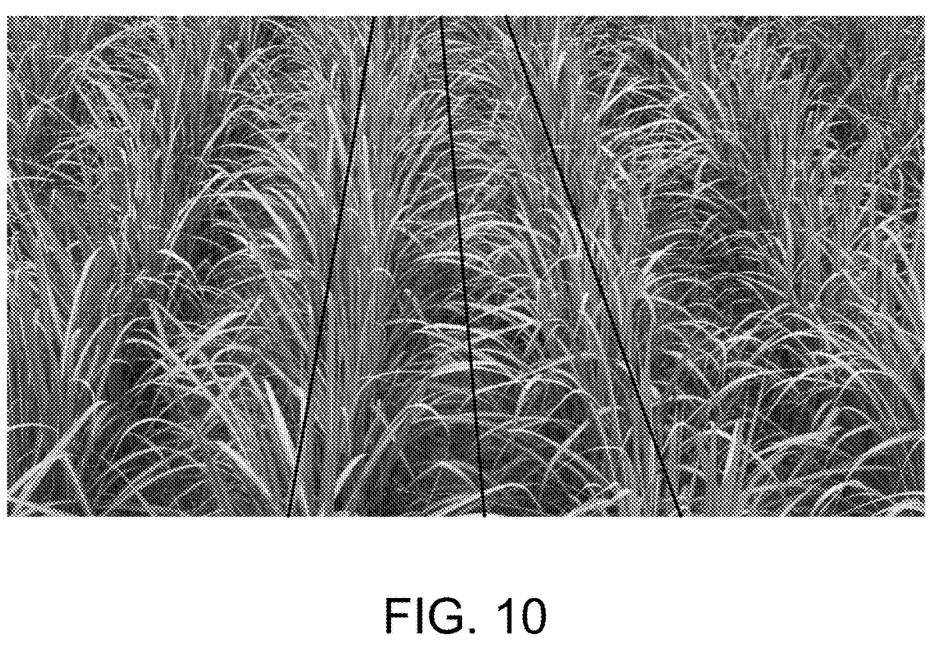
FIG. 10 is a schematic view of a left crop row centerline, a middle row centerline, and a right crop row centerline of the embodiment.

10.5) The ordinates of the pixels in the middle ridge point set SPath serve as independent variables, the abscissas serve as dependent variables, a univariate regression model is constructed for the middle ridge point set SPath, and a middle ridge centerline model pPath is obtained. The straight line where the middle ridge centerline model pPath is located is the navigation line for the field machinery. As shown in FIG. 10, the three straight lines from left to right in the drawing are the left crop row centerline model CL, the middle ridge centerline model pPath, and the right crop row centerline model CR, respectively.

What is claimed is:

1. A method for detecting a field navigation line after a ridge sealing of crops, characterized in that the method comprises steps as follows:
   1) performing crop image acquisition, wherein a camera is used to acquire a field crop image, recorded as an original image S1;
   2) performing image color space transformation, wherein the original image S1 is converted to HSI color space to obtain an HSI image S2;
   3) performing image binarization to obtain a binary image S3;
   4) processing longitudinal integration of the binary image S3 to obtain a longitudinal integral image S4;
   5) performing neighborhood setting,
   wherein a neighborhood of a current pixel is set, the neighborhood is ⅛s of an image width of the original image S1, a 3-row two-dimensional matrix R is used to represent the neighborhood, a column in the two-dimensional matrix R represents a column in the neighborhood, each element of a first row in the two-dimensional matrix R represents a column offset of each column in the neighborhood relative to the current pixel, each element of a second row represents an abscissa offset of a start row of each column in the neighborhood, and each element of a third row represents an abscissa offset of an end row of each column in the neighborhood;
   6) performing region integration calculation,
   wherein a blank image having a size the same as that of the longitudinal integral image S4 is constructed as a region integration image S5, and each pixel is traversed on the longitudinal integral image S4, which is processed in the way as follows: when traversing, current pixel coordinates are marked as (x, y), an accumulator C is set, and an initial value of the accumulator C is set to be 0; when traversing each column of the two-dimensional matrix R and traversing the two-dimensional matrix R, elements of the first row to the third row of a current j-th column are $R_{1j}$, $R_{2j}$, and $R_{3j}$, a difference is obtained by subtracting a pixel value of a pixel with coordinates $(x+R_{3j}-1, y+R_{1j})$ from a pixel value of a pixel with coordinates $(x+R_{3j}, y+R_{1j})$ on the longitudinal integral image S4, the difference is accumulated into the accumulator C, after traversing the two-dimensional matrix R is completed, a value in the accumulator C is taken as a regional integral value M of the current pixel, the regional integral value M is assigned to the pixel having coordinates the same as those of the current pixel in the region integration image S5, and after traversing each pixel of the longitudinal integral image S4 is completed, the region integration image S5 is obtained;

7) performing detections of crop rows, wherein each row is traversed in the region integration image S5, an average value of the regional integral value M of all pixels in each row is calculated, a pixel whose regional integral value M is greater than the average value is set to be 1, the remaining pixels are set to be 0, and a crop row image S6 is obtained;

8) performing detections of an initial middle ridge, a left ridge, and a right ridge;

9) performing detections of left crop row and right crop row;

10) performing detection of a middle ridge.

2. The method for detecting the field navigation line after the ridge sealing of the crops according to claim 1, wherein the step 3) specifically comprises: setting a pixel value of the pixel whose hue component value H is between 0.2 and 0.583 in the HSI image S2 to 1, and setting a pixel value of remaining pixels to 0 to obtain the binary image S3.

3. The method for detecting the field navigation line after the ridge sealing of the crops according to claim 1, wherein the step 4) specifically comprises: duplicating the binary image S3 as the longitudinal integral image S4; traversing each column on the longitudinal integral image S4; in each column, traversing each pixel downward from a pixel of the second row; when traversing, pixel values of pixels of the previous row are added; and covering a result with a pixel value of the current pixel, so as to obtain the longitudinal integral image S4.

4. The method for detecting the field navigation line after the ridge sealing of the crops according to claim 1, wherein the step 8) specifically comprises:

8.1) dividing the crop row image S6 into N crop row sub-images S7 having a width the same as a width of the crop row image S6 and a height 1/N of a height of the crop row image S6;

8.2) taking an i-th crop row sub-image S7, and calculating a longitudinal projection vector S8 of the i-th crop row sub-image S7;

8.3) performing detection of the left boundary of the initial middle ridge, wherein an initial middle ridge start detection template ML0 is constructed, the initial middle ridge start detection template ML0 is a vector whose length is 1/6 of a width of the original image S1, a first half is 1, a second half is −1, the longitudinal projection vector S8 is convolved with the initial middle ridge start detection template ML0, and a column number of a position of a point with a maximum convolution value is taken as an initial middle ridge left boundary $p0L0_i$ of the i-th crop row sub-image S7;

8.4) performing detection of a right boundary of the initial middle ridge, wherein an initial middle ridge termination detection template MR0 is constructed, the initial middle ridge termination detection template MR0 is a vector whose length is 1/6 of the width of the original image S1, a first half is −1, a second half is 1, the longitudinal projection vector S8 is convolved with the initial middle ridge termination detection template MR0, and a column number of a position of a point with a maximum convolution value is taken as an initial middle ridge right boundary $p0R0_i$ of the i-th crop row sub-image S7;

8.5) calculating an initial middle ridge center $p0M0_i$ of the i-th crop row sub-image S7 by a formula as follows: $p0M0_i=(p0L0_i+p0R0_i)/2$;

8.6) performing detection of a left boundary of an initial left row, wherein an initial left row start detection template MR1 is constructed, the initial left row start detection template MR1 is a vector whose length is ½ of a length of the initial middle ridge termination detection template MR0, a first half is −1, a second half is 1, the initial left row start detection template MR1 is used to be convolved with data of the longitudinal projection vector S8 on the left side of the initial middle ridge left boundary $p0L0_i$, and a column number of a position of a point with the maximum convolution value is taken as an initial left row left boundary $CL0_i$ of the i-th crop row sub-image S7;

8.7) performing detection of a right boundary of an initial right row, wherein an initial right row termination detection template ML1 is constructed, wherein the initial right row termination detection template ML1 is a vector whose length is ½ of a length of the initial middle ridge start detection template ML0, a first half is 1, a second half is −1, the initial right row termination detection template ML1 is used to be convolved with data of the longitudinal projection vector S8 on the right side of the initial middle ridge right boundary $p0R0_i$, and a column number of a position of a point with the maximum convolution value is taken as an initial right row right boundary $CR0_i$ of the i-th crop row sub-image S7;

8.8) performing estimation of a center point of the left ridge, wherein an initial left row horizontal center column $CLM0_i$ of the i-th crop row sub-image S7 is calculated by the following formula: $CLM0_i=(CL0_i+p0L0_i)/2$, and then a column $pLM0_i$ where the center point of the left ridge of the i-th crop row sub-image S7 is located is calculated by the following formula: $pLM0_i=2\times CLM0_i-p0M0_i$;

8.9) performing estimation of a center point of the right ridge, wherein an initial right row horizontal center column $CRM0_i$ of the i-th crop row sub-image S7 is calculated by the following formula: $CRM0_i=(CR0_i+p0R0_i)/2$, and then a column $pRM0_i$ where the center point of the right ridge of the i-th crop row sub-image S7 is located is calculated by the following formula: $pRM0_i=2\times CRM0_i-p0M0_i$;

8.10) performing calculation of an ordinate of the crop row sub-image S7, wherein an ordinate of a position of a center point of the crop row sub-image S7 on the crop row image S6 is taken as an ordinate $S7y_i$ of the crop row sub-image S7;

8.11) determining center lines of the initial middle ridge, the left ridge, and the right ridge, wherein step 8.2) to step 8.11) are repeated, the N crop row sub-images S7 of the crop row image S6 are sequentially traversed, each crop row sub-image S7 obtains an initial middle ridge center $p0M0_i$, an initial left row horizontal center column $CLM0_i$, an initial right row horizontal center column $CRM0_i$, and the ordinate $S7y_i$ of the crop row sub-image S7, and therefore results of all N crop row sub-images S7 are composed to obtain a set of an initial middle ridge center set p0M0, an initial left row horizontal center column set CLM0, an initial right row horizontal center column set CRM0, and an ordinate set S7y of the crop row sub-image S7;

wherein the ordinate $S7y_i$ of the crop row sub-image S7 serves as an independent variable, the initial middle ridge center p0M0$_i$, the initial left row horizontal center column CLM0$_i$, the initial right row horizontal center column CRM0$_i$ serve as dependent variables, respectively, univariate regression models pM, pL and pR are constructed between the initial middle ridge center p0M0$_i$ and the ordinate S7$y_i$ of the crop row sub-image S7, between the initial left row horizontal center column CLM0$_i$ and the ordinate S7$y_i$ of the crop row sub-image S7, and between the initial right row horizontal center column CRM0$_i$ and the ordinate S7$y_i$ of the crop row sub-image S7, respectively.

5. The method for detecting the field navigation line after the ridge sealing of the crops according to claim 1, wherein the step 9) specifically comprising:

9.1) constructing a blank right crop row point set SCR and a blank left crop row point set SCL;

9.2) taking a k-th row on the crop row image S6 as a row image S9, wherein an ordinate of the row image S9 as an independent variable is substituted into univariate regression models pM, pL, and pR to obtain a crop middle ridge center column p0M1$_k$, a crop left ridge horizontal center column CLM1$_k$, and a crop right ridge horizontal center column CRM1$_k$ on the current row image S9;

9.3) on the current row image S9, adding the coordinates of a pixel with a pixel value of 1 between the crop middle ridge center column p0M1$_k$ and the crop left ridge horizontal center column CLM1$_k$ corresponding to the crop row image S6 to the left crop row point set SCL;

9.4) on the current row image S9, adding the coordinates of a pixel with a pixel value of 1 between the crop middle ridge center column p0M1$_k$ and the crop right ridge horizontal center column CRM1$_k$ corresponding to the crop row image S6 to the right crop row point set SCR;

9.5) repeating step 9.2) to step 9.4), wherein each row of the crop row image S6 is traversed to obtain the complete left crop row point set SCL and the right crop row point set SCR;

9.6) wherein ordinates of the pixels in the left crop row point set SCL serve as independent variables, abscissas of the pixels in the left crop row point set SCL serve as dependent variables, a univariate regression model for the left crop row point set SCL is constructed, and a left crop row centerline model CL is obtained;

9.7) wherein ordinates of the pixels in the right crop row point set SCR serve as independent variables, abscissas of the pixels in the right crop row point set SCR serve as dependent variables, a univariate regression model for the right crop row point set SCR is constructed, and a right crop row centerline model CR is obtained.

6. The method for detecting the field navigation line after the ridge sealing of the crops according to claim 1, wherein the step 10) specifically comprises:

10.1) constructing a blank middle ridge point set Spath;

10.2) taking a q-th row on the crop row image S6 as a row image S10, wherein an ordinate of the line image S10 as an independent variable is substituted into a left crop row centerline model CL and a right crop row centerline model CR to obtain a left row center point CL1$_q$ and a right row center point CR1$_q$ on the current line image S10;

10.3) on the current line image S10, adding the coordinates of a pixel with a pixel value of 0 between the left row center point CL1$_q$ and the right row center point CR1$_q$ corresponding to the crop row image S6 into the middle ridge point set SPath;

10.4) repeating step 10.2) to step 10.3), wherein each row image S10 of the crop row image S6 is traversed to obtain the complete middle ridge point set Spath;

10.5) wherein the ordinates of the pixels in the middle ridge point set SPath serve as independent variables, abscissas of the pixels in the middle ridge point set SPath serve as dependent variables, a univariate regression model is constructed for the middle ridge point set SPath, a middle ridge centerline model pPath is obtained, and the straight line where the middle ridge centerline model pPath is located is the navigation line for the field machinery.

\* \* \* \* \*